United States Patent
Song (10) Patent No.: US 12,382,178 B2
(45) Date of Patent: Aug. 5, 2025

(54) MULTI-SPORTS SIMULATION APPARATUS

(71) Applicant: Jin Woo Song, Suwon-si (KR)

(72) Inventor: Jin Woo Song, Suwon-si (KR)

(*) Notice: Subject to any disclaimer, the term of this patent is extended or adjusted under 35 U.S.C. 154(b) by 820 days.

(21) Appl. No.: 17/312,468

(22) PCT Filed: Dec. 10, 2019

(86) PCT No.: PCT/KR2019/017374
§ 371 (c)(1),
(2) Date: Jun. 10, 2021

(87) PCT Pub. No.: WO2020/122551
PCT Pub. Date: Jun. 18, 2020

(65) Prior Publication Data
US 2022/0060632 A1     Feb. 24, 2022

(30) Foreign Application Priority Data

Dec. 11, 2018 (KR) .......... 10-2018-0159209

(51) Int. Cl.
| | |
|---|---|
| *H04N 13/243* | (2018.01) |
| *A63B 71/06* | (2006.01) |
| *G06T 7/70* | (2017.01) |
| *H04N 23/51* | (2023.01) |
| *H04N 23/67* | (2023.01) |
| *H04N 23/695* | (2023.01) |
| *H04N 23/90* | (2023.01) |

(Continued)

(52) U.S. Cl.
CPC ....... *H04N 23/695* (2023.01); *A63B 71/0622* (2013.01); *G06T 7/70* (2017.01); *H04N 23/51* (2023.01); *H04N 23/67* (2023.01); *H04N 23/90* (2023.01); *A63B 69/0002* (2013.01); *A63B 2069/0008* (2013.01); *A63B 69/002* (2013.01); *A63B 69/36* (2013.01); *A63B 2220/806* (2013.01); *A63B 2243/0025* (2013.01)

(58) Field of Classification Search
CPC ...... H04N 23/695; H04N 23/51; H04N 23/67; H04N 23/90; G06T 7/70; A63B 71/0622; A63B 69/0002; A63B 69/002; A63B 69/36; A63B 2069/0008; A63B 2220/806; A63B 2243/0025
See application file for complete search history.

(56) References Cited

U.S. PATENT DOCUMENTS

| | | | |
|---|---|---|---|
| 10,585,344 B1* | 3/2020 | Lablans | H04N 23/58 |
| 2010/0097444 A1* | 4/2010 | Lablans | G03B 35/00 |
| | | | 348/46 |
| 2018/0240241 A1* | 8/2018 | Armstrong | G06T 7/13 |

FOREIGN PATENT DOCUMENTS

| | | |
|---|---|---|
| JP | 2013-009789 A | 1/2013 |
| KR | 10-2010-0137687 A | 12/2010 |

(Continued)

OTHER PUBLICATIONS

International Searching Authority, International Search Report of PCT/KR2019/017374 dated Apr. 10, 2020 [PCT/ISA/210].

*Primary Examiner* — Patrick E Demosky
(74) *Attorney, Agent, or Firm* — Sughrue Mion, PLLC (57) ABSTRACT

A multi-sports simulation apparatus includes a housing which includes camera accommodation spaces for attaching side camera units at both ends thereof in a longitudinal direction and a central portion in which an opening is formed so that a central camera unit fixed to a frame passes through the opening.

2 Claims, 9 Drawing Sheets

(51) Int. Cl.
    *A63B 69/00*     (2006.01)
    *A63B 69/36*     (2006.01)

(56)     References Cited

FOREIGN PATENT DOCUMENTS

| | | |
|---|---|---|
| KR | 10-1215401 B1 | 12/2012 |
| KR | 10-1270025 B1 | 5/2013 |
| KR | 10-1967828 B1 | 7/2019 |

\* cited by examiner

MULTI-SPORTS SIMULATION APPARATUS

CROSS REFERENCE TO RELATED APPLICATIONS

This application is a National Stage of International Application No. PCT/KR2019/017374, filed Dec. 10, 2019, claiming priority to Korean Patent Application No. 10-2018-0159209, filed Dec. 11, 2018.

BACKGROUND

1. Field of the Invention

The present invention relates to a simulation apparatus, and more particularly, to a multi-sports simulation apparatus which may be used in various ball sports.

2. Discussion of Related Art

Screen golf is a golf simulation system which provides the experience of being on a course even in a limited space. Screen golf analyzes the swing of an actual golf club and the movement of a golf ball almost like in a real golf game and thus is loved by many golf users.

A simulation apparatus used in existing screen golf calculates a physical quantity of an actual golf ball as well as a physical quantity of the swing of a golf club and provides analysis results. Precision is increased by carrying out the analysis focusing on a limited object, that is, the golf ball.

Algorithms required for calculating physical quantities according to hitting of balls are somewhat similar, and thus there are increasing attempts to apply the algorithms to various ball sports. For example, recently, various sports, such as screen baseball and screen tennis, which may be enjoyed indoors are being provided.

Since a screen sports simulation still involves expensive equipment and requires a certain space, people may enjoy the screen sports simulation by paying a rather high service fee. Simulation sports have a slightly lower sense of reality compared to those enjoyed on real golf courses and playgrounds, but there is an advantage that a physical quantity can be calculated according to hitting of a ball and a user's motion can be analyzed. In particular, sports including baseball, soccer, etc. are enjoyed outdoors and thus significantly affected by external environments such as the weather, but sports employing a screen can offset this disadvantage.

Meanwhile, in public education institutions such as elementary schools, middle schools, high schools, etc., students are divided into a plurality of classes, and lessons are provided according to an academic schedule set for each class. Therefore, even in bad weather, a physical education class should be held according to the schedule. Sports activities using indoor auditoriums and the like are possible, but there is a problem of using a relatively cramped space compared to the playground. Also, types of sports, such as golf and baseball, have a possibility of injuring a third party with a hit ball, and thus they are difficult to learn or teach in the public education field.

A merit of screen sports can be a great advantage in terms of usability for educational purposes. In addition, in the public education field in which the curriculum is set according to a certain schedule, screen sports are considered to be more useful when indoor spaces are used for physical education in bad weather.

If a general-use simulation apparatus is provided to be widely used for various ball sports, such as baseball, soccer, golf, part golf, and badminton, which can be taught in the public education field, it is expected to increase the interest of students and generally improve learning effects.

SUMMARY OF THE INVENTION

The present invention is directed to providing a multi-sports simulation apparatus which may be widely used for ball sports employing variously sized balls and may be conveniently set according to an environment of an installation place.

Objects of the present invention are not limited to those described above, and other objects which have not been described will be clearly understood by those of ordinary skill in the art from the following descriptions.

According to an aspect of the present invention, there is provided a multi-sports simulation apparatus including a housing including camera accommodation spaces for attaching side camera units at both ends thereof in a longitudinal direction and a central portion in which an opening is formed so that a central camera unit fixed to a frame passes through the opening.

The camera accommodation space may be provided with a first surface extending from the central portion at a certain angle and a second surface which extends from the first surface and is formed at a certain angle with respect to the first surface to face the central portion and to which the side camera unit is attached so that the side camera unit is disposed in the camera accommodation space.

The side camera units may include a lens unit, a level adjustment unit coupled to the lens unit to change a focal axis of the lens unit, an actuator coupled to the level adjustment unit, and a level control unit configured to control the actuator so that the focal axis of the lens unit crosses a focal axis of the central camera unit at an arbitrary point.

The multi-sports simulation apparatus may further include a lower cover in which openings through which the lens units of the side camera units pass are formed and which is attached under the housing and cover members configured to cover the openings formed in the lower cover and the periphery of the openings.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Objects and effects of the present invention and technical configurations for achieving them will become apparent with reference to embodiments described in detail below in conjunction with the accompanying drawings. In the following description of the present invention, known functions or configurations will not be described in detail when it is determined that the gist of the present invention may be unnecessarily obscured thereby. The following terms are defined in consideration of the functions in the present invention and may vary depending on the intentions or customs of a user or operator.

However, the present invention is not limited to the embodiments disclosed below and may be implemented in various other ways. The embodiments are provided so that the disclosure of the present invention will be thorough and complete and will fully convey the scope of the invention to those of ordinary skill in the art. The scope of the present invention is only defined by the claims. Therefore, definitions should be based on the overall content of this specification.

Throughout the specification, when a part is referred to as "including" or "having" a certain component, this does not preclude other components and units that other components may further be included unless stated to the contrary. Also, terms, such as "unit," "part," and "module," refer to units for processing at least one function or operation, and such units may be implemented with hardware, software, or a combination of hardware and software.

Meanwhile, in exemplary embodiments of the present invention, each of components, functional blocks, or units may include one or more sub-components, and electrical, electronic, and mechanical functions performed by the components may be implemented as various known devices or mechanical components including an electronic circuit, an integrated circuit, an application specific integrated circuit (ASIC) and the like. The components may be separately implemented, or two or more of the components may be integrated into one.

In exemplary embodiments of the present invention, a user device unit any calculation unit for collecting, reading, handling, processing, storing, and displaying data such as a desktop computer, a laptop computer, a smart phone, a personal digital assistant (PDA), and a cellular phone. In particular, the user device in exemplary embodiments of the present invention is a device having a function of executing software written in interpretable code and displaying and transferring the software being executed to a user. Also, as necessary, the user device may store the software therein or read the software together with data from the outside.

Also, the user device in exemplary embodiments of the present invention may include not only the above data processing function but also functions of input, output, storage, and the like. To this end, the user device may include not only various elements, such as a central processing unit (CPU), a mainboard, a graphics card, a hard disk drive, a sound card, a speaker, a keyboard, a mouse, a monitor, a universal serial bus (USB) terminal, and a communication modem, that general computing devices have but also a CPU, a mainboard, a graphics chip, a memory chip, a sound engine, a speaker, a touchpad, an external connection terminal, such as a USB terminal, a communication antenna, a communication modem for performing third generation (3G), Long Term Evolution (LTE), LTE-advanced (LTE-A), Wi-Fi, Bluetooth, etc. communication, and the like that wireless smart phone terminals have. Such elements may be used alone or in combination of two or more or parts of the elements may be combined to implement one or more functions. Devices, which are illustrated as one or more blocks in the drawings or detailed description according to exemplary embodiments of the present invention, or parts of the devices may represent one or more functions which are provided by various elements included in the user device alone or in combination of two or more or combined parts of the elements.

Meanwhile, in exemplary embodiments of the present invention, the user device, a multi-sports simulation apparatus, etc. may have a communication function and have various networking units, such as wired Internet, wireless Internet, infrared communication, Bluetooth, wideband code division multiple access (WCDMA), wireless broadband (WiBro), Wi-Fi, LTE, LTE-A, 3G, fourth generation (4G), fifth generation (5G), and a wired or wireless telephone network, to perform the communication function.

Hereinafter, a multi-sports simulation apparatus according to the exemplary embodiment of the present invention will be described in detail with reference to the accompanying drawings.

Figure 1:
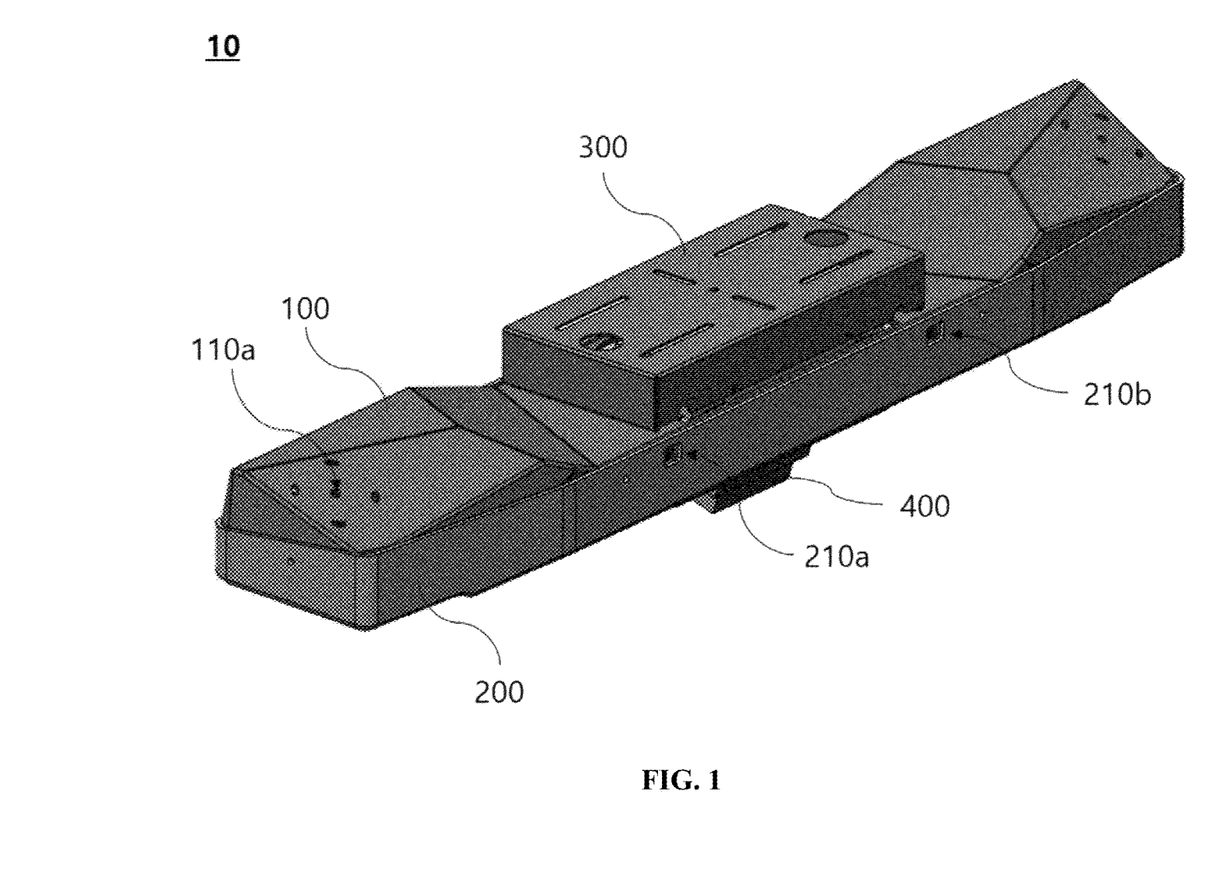
FIG. 1 is a perspective view of a multi-sports simulation apparatus according to an exemplary embodiment of the present invention from a rear side.
Figure 2:
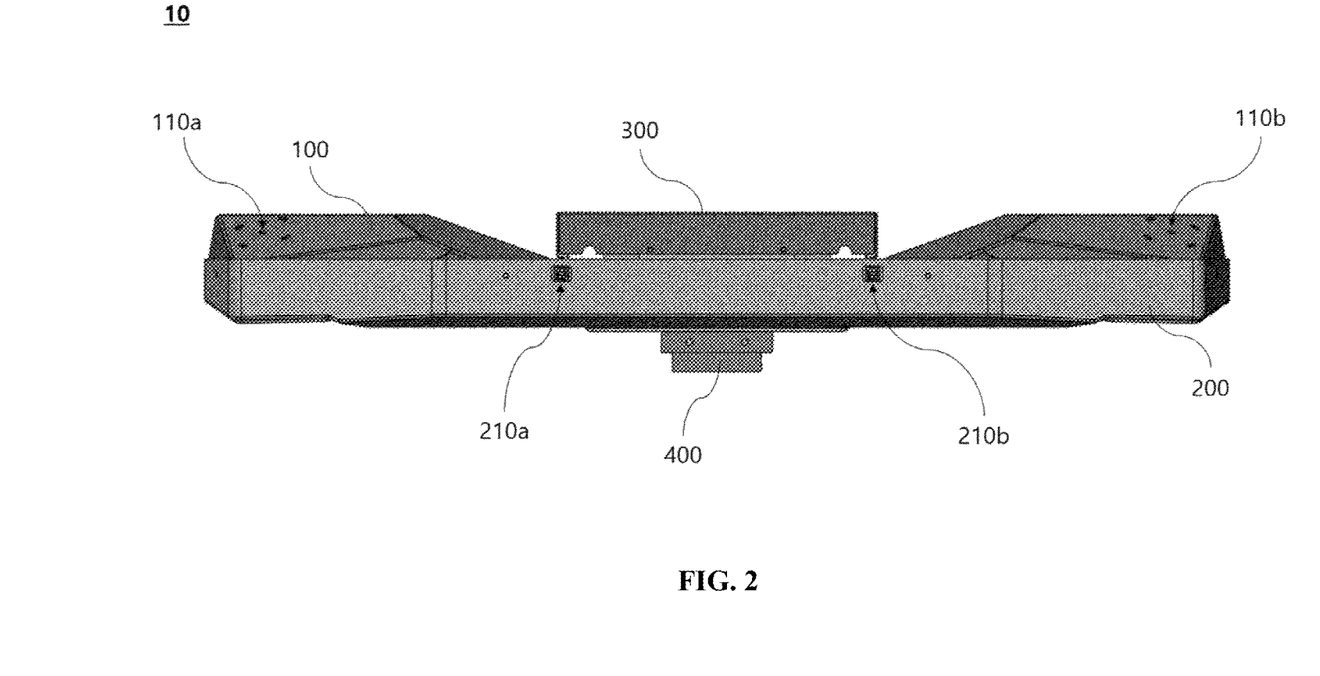
FIG. 2 is a rear view of the multi-sports simulation apparatus according to the exemplary embodiment of the present invention.

FIG. 1 is a perspective view of a multi-sports simulation apparatus 10 according to exemplary embodiments of the present invention from a rear side, and FIG. 2 is a rear view of the multi-sports simulation apparatus 10 according to exemplary embodiments of the present invention.

Referring to FIG. 1, the multi-sports simulation apparatus 10 according to exemplary embodiments of the present invention includes a housing 100, a lower cover 200, a fixing frame 300. In the housing 100, coupling holes 110 for fixing side camera units 500 may be formed.

In certain areas of the housing 100 and the lower cover 200 of the housing 100, cable connection holes 210 may be formed to allow the connection of cables for supplying electric power to a central camera unit 400 or the side camera units 500 or transmitting a control signal for controlling the camera units.

Since the housing 100 or the lower cover 200 may include a camera unit and the like including electrical or electronic parts, a polymer material with flame retardant and insulating properties may be used. As the polymer material, polybutylene terephthalate (PBT), polyamide (PA), or the like may be used. However, the polymer material is not limited thereto, and any material which has insulating and flame retardant properties while maintaining the appearance of the housing 100 is applicable. Also, the housing 100 may be mainly formed of a metal material, and a flame retardant polymer material may be applied to a portion of the housing 100 requiring electrical insulation.

In the multi-sports simulation apparatus 10 according to exemplary embodiments of the present invention, the housing 100 includes camera accommodation spaces for attaching the side camera units 500 at both ends thereof in a longitudinal direction, and an opening is formed in a central portion of the housing 100 so that the central camera unit 400 fixed to a frame passes through the opening.

As seen from FIGS. 1 and 2, the camera accommodation spaces for attaching the side camera units 500 may be provided on both sides of a portion of the housing 100 where the fixing frame 300 is attached. As seen from FIGS. 1 and 2, upper ends of the camera accommodation spaces are formed to have a lower height than the fixing frame 300.

The fixing frame 300 may include a bracket for fixing the central camera unit 400. The fixing frame 300 may be attached onto an upper portion of the housing 100 so that the multi-sports simulation apparatus 10 according to exemplary embodiments may be fixed to a ceiling or the like.

Figure 3:
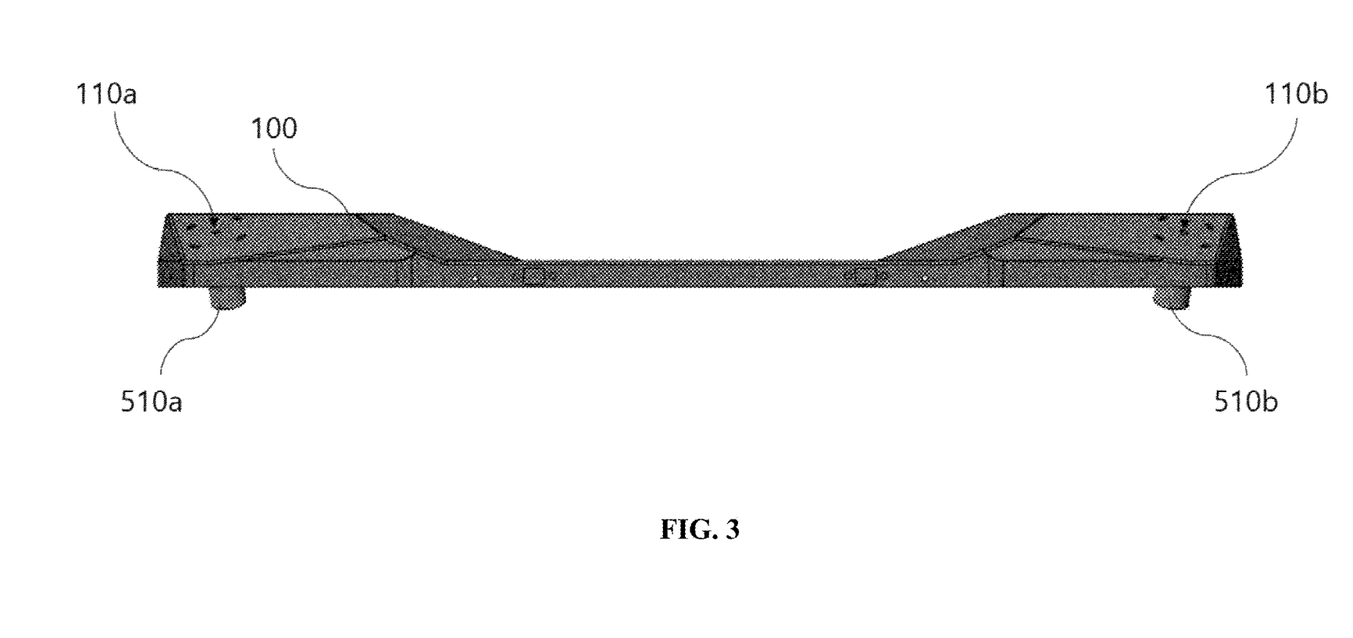
FIG. 3 is a bottom view of the multi-sports simulation apparatus according to the exemplary embodiment of the present invention from which a lower cover is removed.

FIG. 3 is a bottom view of the multi-sports simulation apparatus 10 according to exemplary embodiments of the present invention from which the lower cover 200 is removed.

Figure 4:
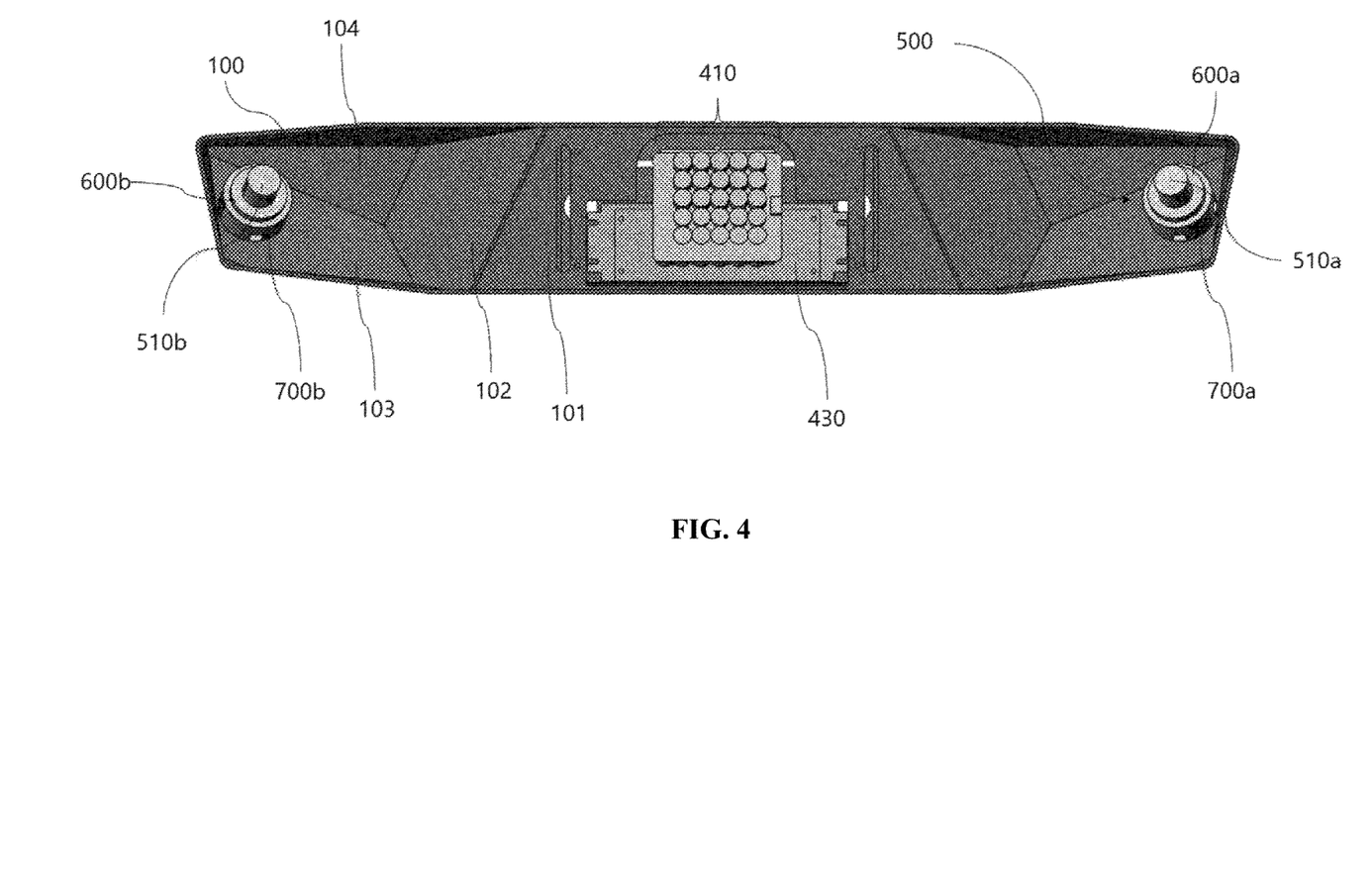
FIG. 4 is a rear view of the multi-sports simulation apparatus according to the exemplary embodiment of the present invention from which the lower cover is removed.

Referring to FIG. 2, the central camera unit 400 passes through the lower cover 200 and is directed downward. As seen from FIG. 2, the opening through which the central camera unit 400 passes is formed in the central portion of the housing 100. As shown in FIG. 4, the central camera unit 400 includes a plurality of central camera units 410, and a heat sink 430 may be provided to dissipate heat which may be generated by a plurality of operating cameras. Accordingly, the central camera unit 400 is attached to the fixing frame 300.

As seen from FIGS. 1 to 4, in the housing 100 of the multi-sports simulation apparatus 10 according to exemplary embodiments of the present invention, the camera accommodation spaces may be provided with a first surface 102 which extends from a central portion 101 at a certain angle and a second surface 103 which extends from the first surface 102 at a certain angle with respect to the first surface 102 to face the central portion 101 and allow the side camera units 500 to be disposed in the camera accommodation space.

When a downward focal axis of the central camera unit 400 and a focal axis of the side camera unit 500 cross at arbitrary point, a clear image of a hit ball may be obtained, and a physical quantity, such as a rotation speed, of the hit ball may be more effectively measured using the clear image. Therefore, the second surface 103 may be formed so that the focal axis of the side camera unit 500 disposed on the second surface 103 may cross a central axis of the central camera unit 400.

Meanwhile, the central camera unit 400 may be provided to capture vertical downward images or diagonal downward images. To acquire images of hit balls in various ball sports, it may be efficient to align a camera lens in a diagonal direction rather than a linearly downward direction. In order for the focal axis of the central camera unit 400 disposed to acquire an image in a diagonal direction with respect to the ground to cross the focal axis of the side camera unit 500, a third surface 104 may be formed in addition to the first surface 102 and the second surface 103 as shown in FIG. 4.

FIG. 4 is a rear view of the multi-sports simulation apparatus 10 according to exemplary embodiments of the present invention from which the lower cover 200 is removed.

Referring to FIGS. 3 and 4, the side camera units 500 disposed in the camera accommodation spaces of the housing 100 are disposed in a direction at a diagonal angle with respect to the ground surface.

Meanwhile, in the multi-sports simulation apparatus 10 according to exemplary embodiments of the present invention, the side camera unit 500 may include a lens unit 510, a level adjustment unit 600 coupled to the lens unit 510 to change a focal axis of the lens unit 510, an actuator coupled to the level adjustment unit 600, and a level control unit 700 which controls the actuator so that the focal axis of the lens unit 510 may cross the focal axis of the central camera unit 400 at an arbitrary point.

The actuator is a motor which uses electricity, hydraulic pressure, compressed air, and the like. Anything for converting an electrical signal of the level control unit 700 and adjusting the level of the level adjustment unit 600 may be applied without limitation.

With this configuration, the multi-sports simulation apparatus 10 according to exemplary embodiments of the present invention may be fixedly installed on a ceiling of a room having different heights. In this case, the focal axes of the central camera unit 400 and the side camera units 500 may be adjusted toward arbitrary directions. In this way, focuses of the central camera unit 400 and the side camera units 500 may be controlled to coincide with each other such that a clear image can be acquired.

For example, in the case of soccer, a user kicks a soccer ball placed on a mat, which is the same as in golf. However, there is a huge difference in size between a soccer ball and a golf ball. Accordingly, when the type of sport is changed from golf to soccer, it is necessary to adjust the focus of the central camera unit 400 and directions of the focal axes and the focuses of the side camera units 500 in consideration of the size of a soccer ball.

To this end, the level adjustment unit 600 of the side camera unit 500 is attached under the lens units 510 so that the focal axis of the lens unit 510 may point in an arbitrary direction. The level adjustment unit 600 may be connected to the actuator of the level control unit 700 and control the focal axis of the lens unit 510 according to a control signal transmitted from a user device or a server.

The level control unit 700 may control the actuator using focus information of the central camera unit 400 so that the focal axis of the lens unit 510 may point in a direction corresponding to the focus information of the central camera unit 400.

Figure 5:
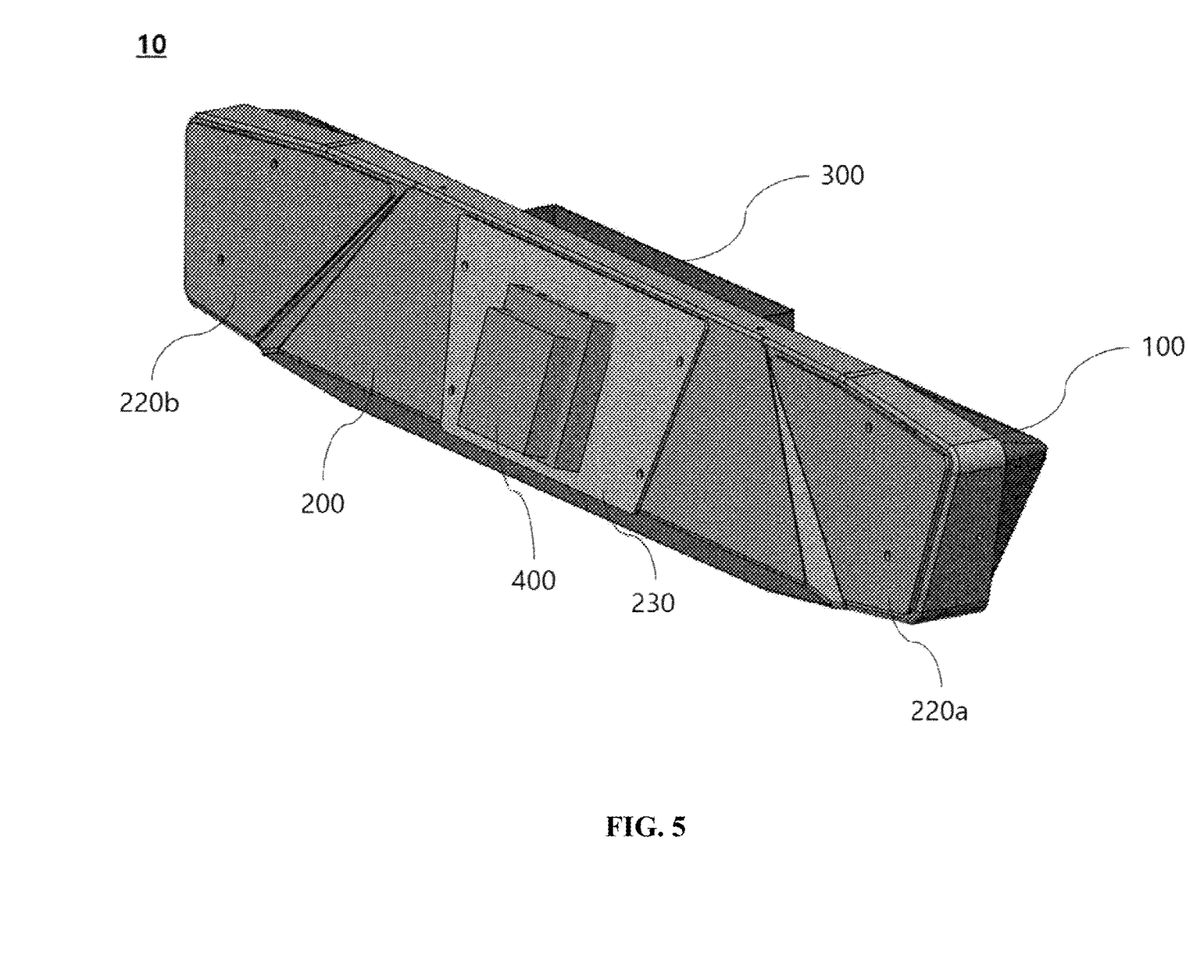
FIG. 5 is a bottom view of the multi-sports simulation apparatus according to the exemplary embodiment of the present invention.
Figure 6:
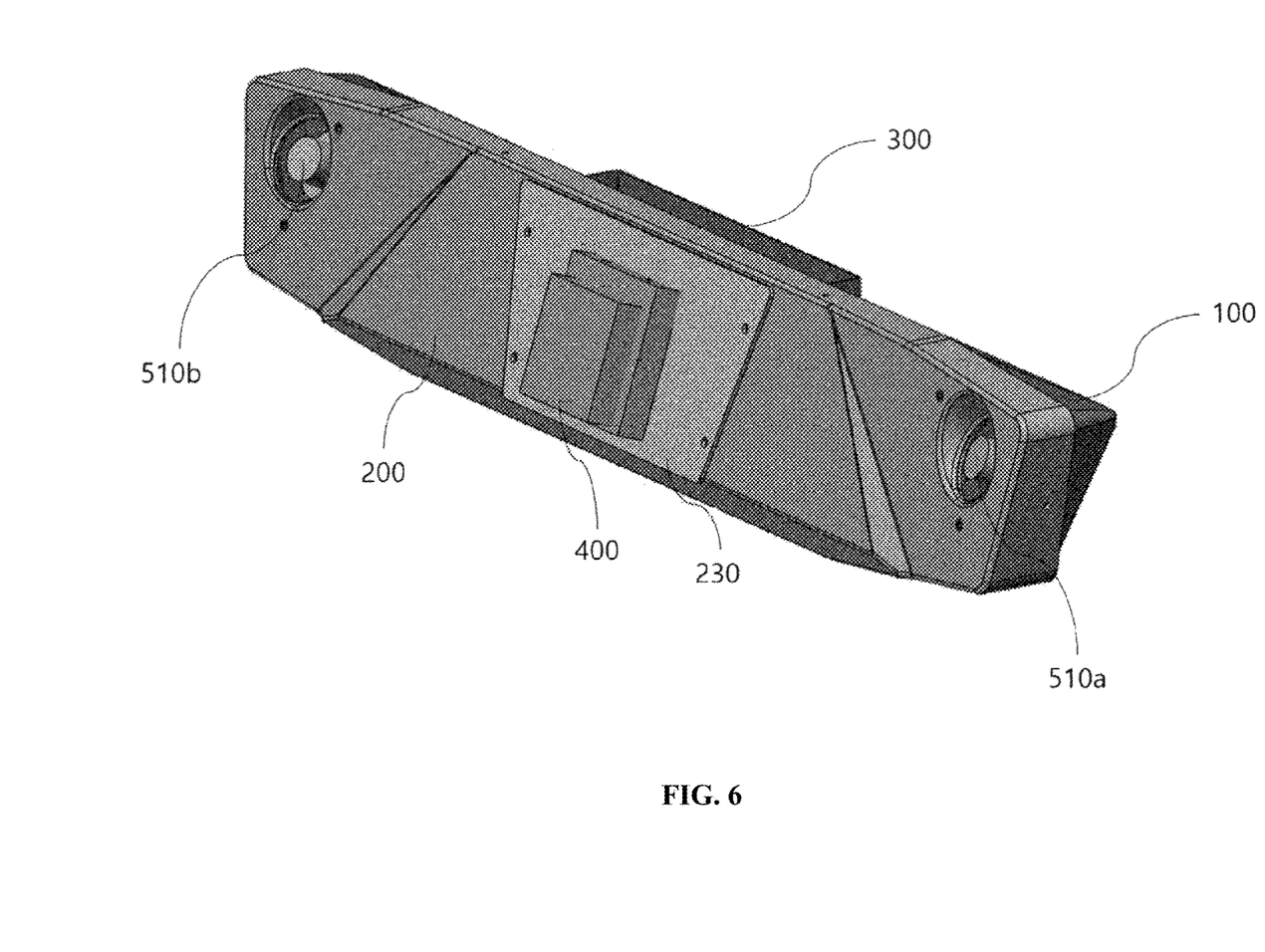
FIG. 6 is the bottom view of the multi-sports simulation apparatus according to the exemplary embodiment of the present invention from which cover members attachable to the lower cover are removed.

FIG. 5 is a bottom view of the multi-sports simulation apparatus 10 according to exemplary embodiments of the present invention, and FIG. 6 is the bottom view of the multi-sports simulation apparatus 10 according to exemplary embodiments of the present invention from which cover members 220 attachable to the lower cover 200 are removed.

According to exemplary embodiments of the present invention, the multi-sports simulation apparatus 10 may further include the lower cover 200 in which the openings through which the lens units 510 of the side camera units 500 pass are formed and which is attached under the housing 100 and the cover members 220 which cover the openings formed in the lower cover 200 and the periphery of the openings.

Referring to FIGS. 5 and 6, it is possible to see the openings of the lower cover 200 and the lens units 510 of the side camera units 500 disposed in the openings. This is intended to minimize the interference of ambient light reflection and the like. A transparent or semi-transparent polymer material, a glass plate, or the like that allows light to pass through may be used as the cover members 220. However, the cover members 220 are not limited thereto, and any material which has a certain level of transparency while efficiently blocking the interference of light may be applied without limitation.

Figure 7:
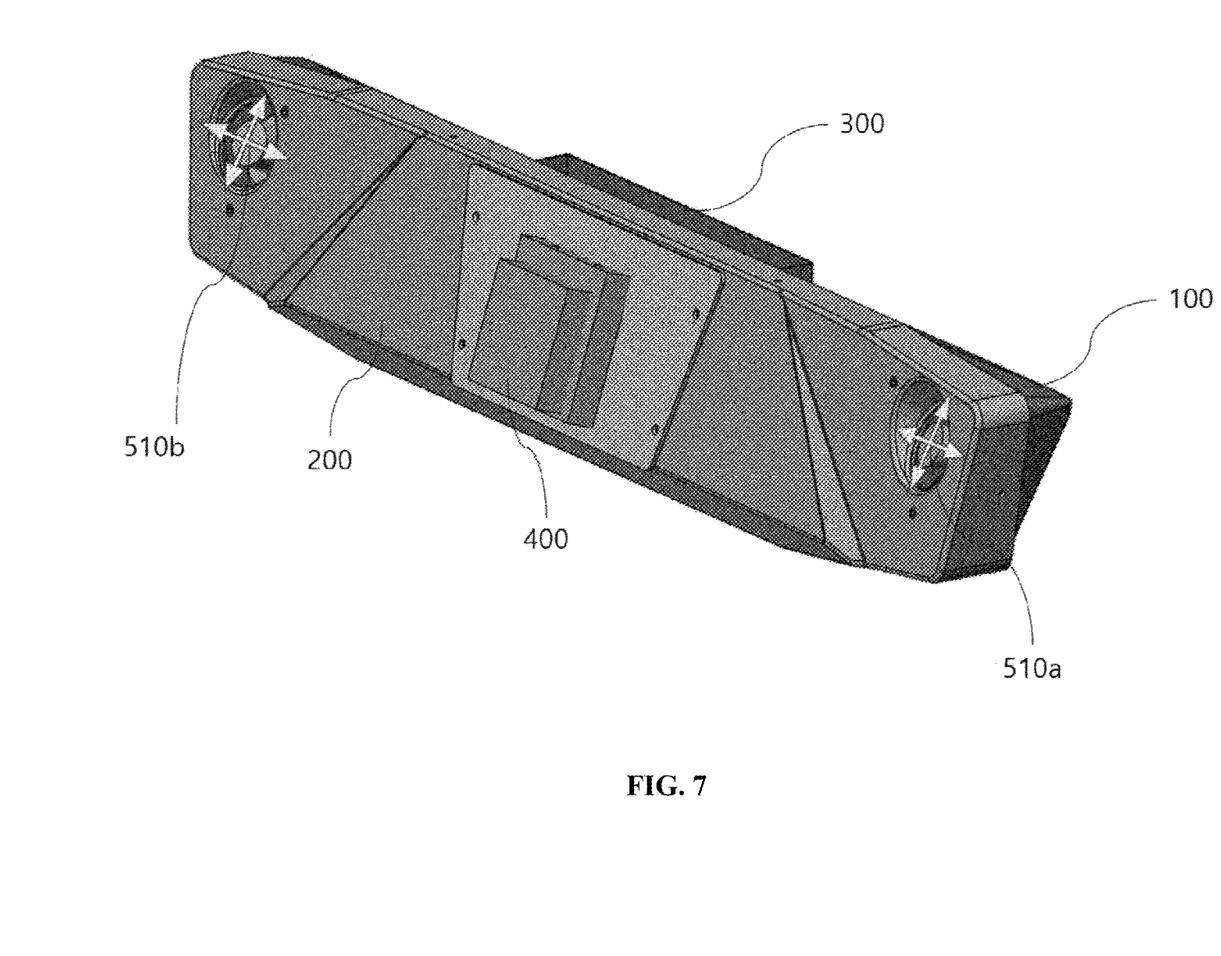
FIG. 7 is a view illustrating operating directions of side cameras of the multi-sports simulation apparatus according to the exemplary embodiment of the present invention.

FIG. 7 is a view illustrating operating directions of side cameras of the multi-sports simulation apparatus 10 according to exemplary embodiments of the present invention.

As described with reference to FIG. 3, in order to acquire an image of a hit ball, it is advantageous for the focal axis of the side camera unit 500 to cross the central axis of the central camera unit 400 at an arbitrary point. Accordingly, the focal axis of the side camera unit 500 is not moved in only one direction but may rather be moved with the degree of freedom in at least four directions as illustrated in FIG. 4.

The level control unit 700 may control the level adjustment unit 600 according to arbitrary information transmitted from the user device or the server. However, control for the level adjustment unit 600 is not limited thereto, and an automatic control method may be used so that the central camera unit 400 and the side camera units 500 may be focused on a ball below through a feedback control method.

Alternatively, the level control unit 700 may control the actuator through a feedback control method on the basis of the focus information of the central camera unit 400 so that the focal axis of the lens unit 510 may point in the direction corresponding to the focus information of the central camera unit 400.

The automatic focus control method may be set in advance so that the focuses may be adjusted on the ground surface or within a certain height range from the ground surface. For example, in the case of soccer and golf, the ball is hit near the ground surface, and thus the focus may be set to a height range from about 0.5 cm to about 30 cm. In the case of hitting a ball with a bat, batting is performed at the height of waist. Accordingly, the focus may be set to a height range of about 0.5 m to about 1.5 m from the ground surface so that the level control unit 700 and the like may finish setting more rapidly.

Figure 8A:
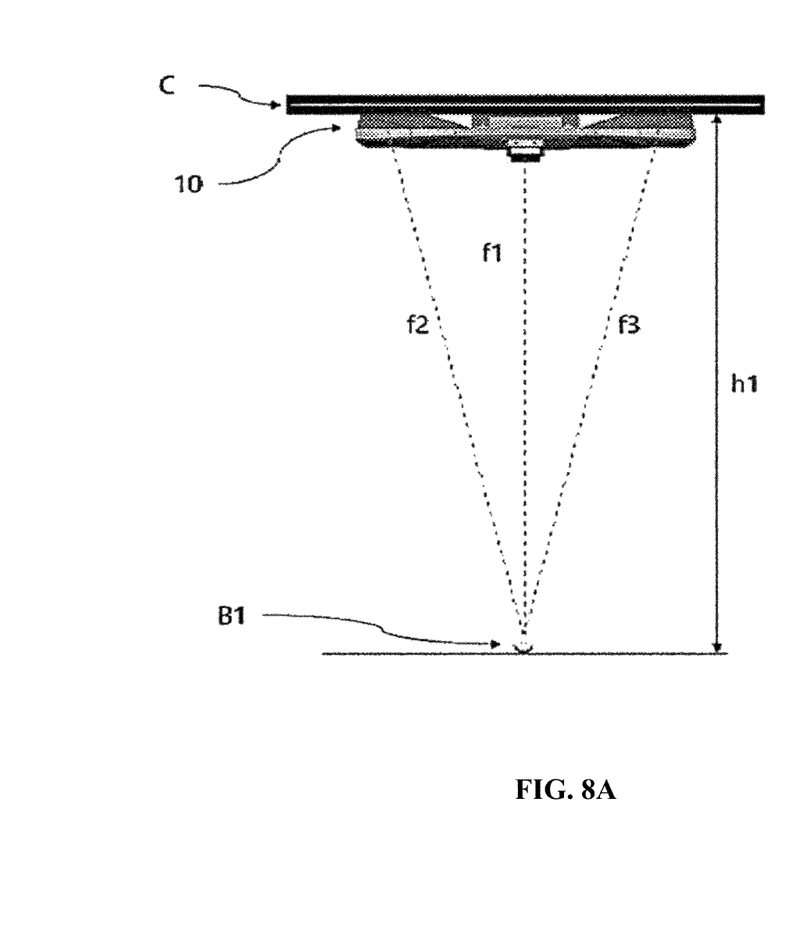
FIGS. 8A and 8B illustrate a set of examples in which a height of the multi-sports simulation apparatus according to the exemplary embodiment of the present invention varies.
Figure 8B:
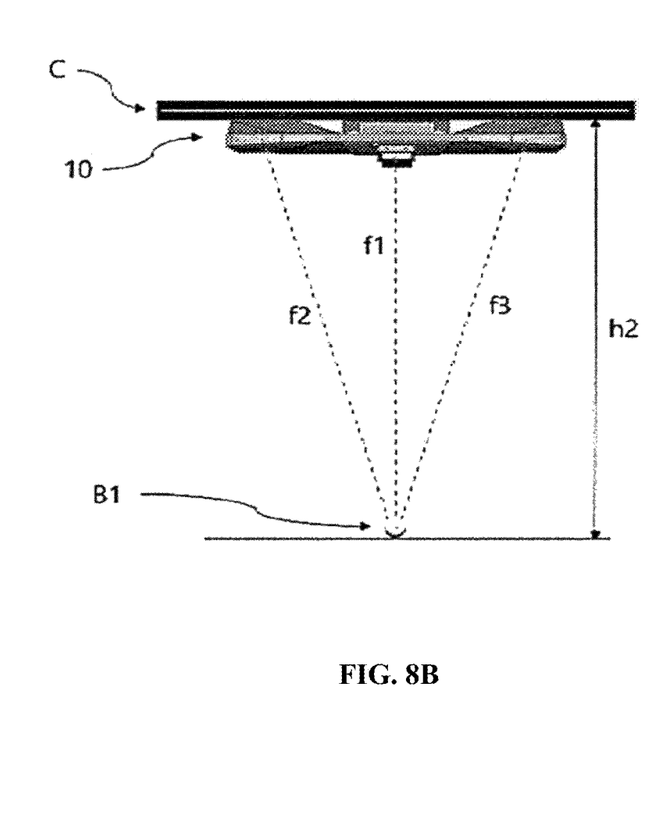

FIGS. 8A and 8B illustrate a set of examples in which a height of the multi-sports simulation apparatus according to the exemplary embodiment of the present invention varies.

FIGS. 8A and 8B show the multi-sports simulation apparatus according to the exemplary embodiment of the present invention installed on ceilings of different heights.

Heights of ceilings of FIGS. 8A and 8B are h1 and h2, respectively. In the case of golf, the multi-sports simulation apparatus according to the exemplary embodiment of the present invention may move a focal axis f2 or f3 so that the focus of the lens unit 510 included in the side camera unit 500 may coincide with the focus of the central camera unit 400 according to the height of installation. Accordingly, when the multi-sports simulation apparatus is moved from the height h1 to the height h2, the actuator may be controlled so that the central camera unit 400 and the side camera unit 500 may be focused on a golf ball after the multi-sports simulation apparatus is installed at the height of the ceiling.

Figure 9A:
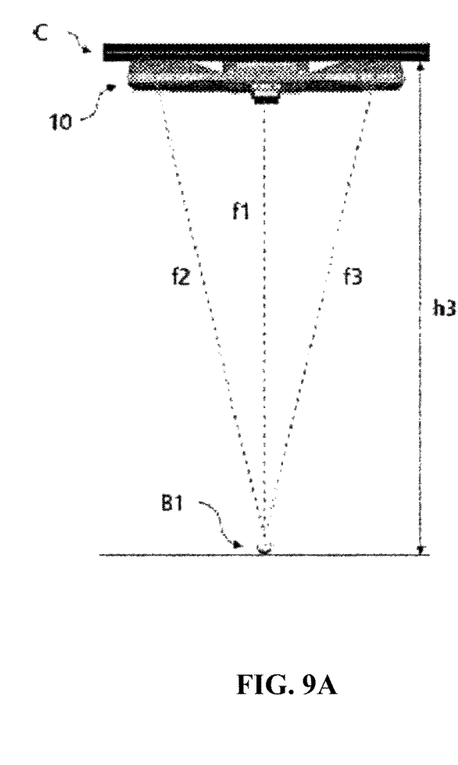
FIGS. 9A to 9C illustrate a set of examples in which the multi-sports simulation apparatus according to the exemplary embodiment of the present invention is applied to different sports.
Figure 9B:
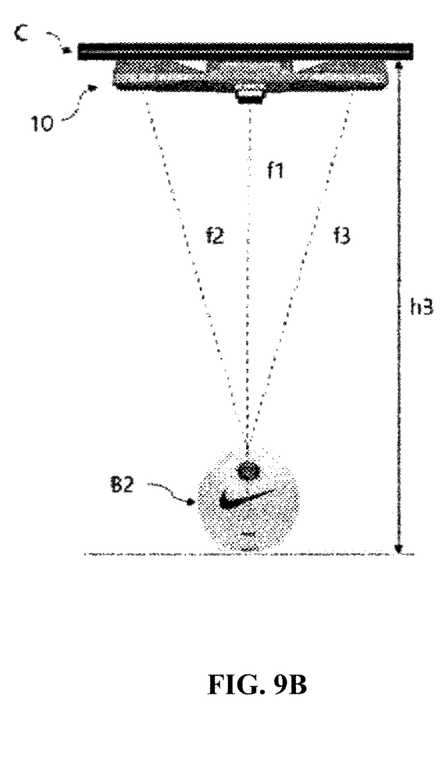
Figure 9C:
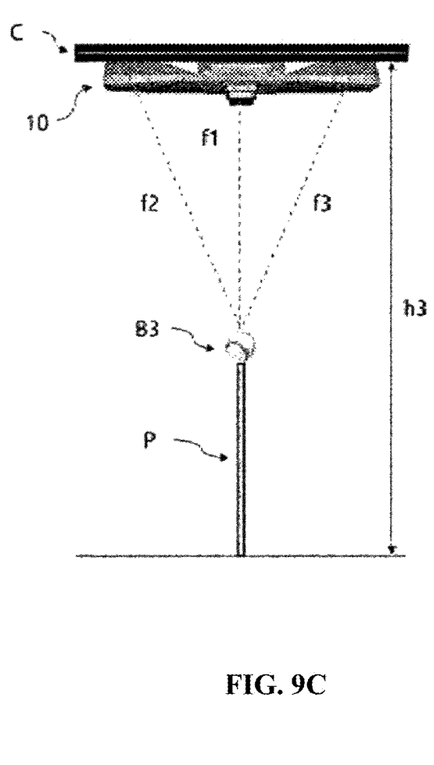

FIGS. 9A to 9C illustrate a set of examples in which the multi-sports simulation apparatus according to the exemplary embodiment of the present invention is applied to different sports.

Referring to FIGS. 9A to 9C, heights of ceilings are all the same, that is, h3, but a height of focus varies depending on ball size or the types of sports. FIGS. 9A, 9B, and 9C illustrate golf, soccer, and T-ball, respectively. Referring to each of the drawings, a golf ball and a soccer ball are different in size, and thus focuses are different. Accordingly, for more precise measurement, it is necessary to adjust a point at which the focal axes of the central camera unit 400 and the side camera units 500 cross. In the case of T-ball, a ball B3 is put on a tee P, and tee batting is performed. In this case, it is necessary to hit the ball B3 positioned at a certain height from the ground surface, and for precise measurement, it is necessary to adjust the point at which the focal axes of the central camera unit 400 and the side camera units 500 cross. Since the height of the tee P may vary depending on a user's height (adult or child), it is necessary to change the point at which the focal axes of the central camera unit 400 and the side camera units 500 cross even in the same type of sport. The multi-sports simulation apparatus according to the exemplary embodiment of the present invention can be easily controlled so that the central camera unit 400 and the side camera units 500 may be focused on the ball B3.

As described above, the multi-sports simulation apparatus installed on a ceiling of the same space according to exemplary embodiments of the present invention can be used to enjoy various types of screen sports regardless of the position (or height) of installation.

The present invention can provide a multi-sports simulation apparatus which can be widely used for ball sports employing variously sized balls and can be conveniently set according to an environment of an installation place.

Effects of the present invention are not limited to that described above, and other effects which have not described will be clearly understood by those of ordinary skill in the art from the above descriptions.

In the present specification and drawings, the exemplary embodiments of the present invention have been disclosed. Although specific terms are used, these are merely used in a general sense to easily describe the technical content of the present invention and aid understanding of the present invention and are not intended to limit the scope of the present invention. It is self-evident to those of ordinary skill in the art that modifications can be made based on the technical spirit of the present invention in addition to the embodiments set forth herein.

What is claimed is:
1. A multi-sports simulation apparatus comprising:
a housing including camera accommodation spaces for attaching side camera units at both ends thereof in a longitudinal direction and a central portion in which an opening is formed so that a central camera unit fixed to a frame passes through the opening,
wherein the side camera units are provided on surfaces tilted to face the central camera unit, and comprise:
a lens unit;
a level adjustment unit coupled to the lens unit to change a focal axis of the lens unit;
an actuator coupled to the level adjustment unit; and
a level control unit configured to control the actuator so that the focal axis of the lens unit crosses a focal axis of the central camera unit at an arbitrary point, and
the level control unit controls the actuator through a feedback control method on the basis of focus information of the central camera unit so that the focal axis of the lens unit points in a direction corresponding to the focus information of the central camera unit,
each of the camera accommodation spaces comprises only three surfaces that converge at a single vertex, which acts as a point of convergence for the three surfaces,
the three surfaces are tilted to extend outward from the single vertex, and comprise:

a first surface extending from the central portion of the housing; and a second surface which extends from the first surface and is formed at a certain angle with respect to the first surface to face the central portion of the housing and on which the side camera unit is mounted; and a third surface provided between the first surface and the second surface;

each of the side camera units is mounted only on the second surface among the three surfaces in the camera accommodation spaces.

2. The multi-sports simulation apparatus of claim 1, further comprising:

a lower cover in which openings through which the lens units of the side camera units pass are formed and which is attached under the housing; and cover members configured to cover the openings formed in the lower cover and the periphery of the openings.

* * * * *